United States Patent
Reial et al.

(10) Patent No.: US 11,129,132 B2
(45) Date of Patent: Sep. 21, 2021

(54) FLEXIBLE PAGING SIGNAL CONFIGURATION IN RELATION TO SYSTEM ACCESS SIGNALS

(71) Applicant: Telefonaktiebolaget LM Ericsson (publ), Stockholm (SE)

(72) Inventors: Andres Reial, Malmö (SE); Magnus Åström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 384 days.

(21) Appl. No.: 15/684,551

(22) Filed: Aug. 23, 2017

(65) Prior Publication Data

US 2019/0069271 A1    Feb. 28, 2019

(51) Int. Cl.
*H04W 68/02*    (2009.01)
*H04W 56/00*    (2009.01)
(Continued)

(52) U.S. Cl.
CPC ......... *H04W 68/02* (2013.01); *H04W 56/001* (2013.01); *H04W 72/005* (2013.01); *H04W 76/28* (2018.02)

(58) Field of Classification Search
CPC . H04W 68/02; H04W 76/048; H04W 72/005; H04W 68/00; H04W 88/185; H04J 4/005
See application file for complete search history.

(56) References Cited

U.S. PATENT DOCUMENTS

| 6,044,069 A | * | 3/2000 | Wan | H04W 52/0216 370/311 |
| 7,551,663 B1 | * | 6/2009 | Proctor, Jr. | H04B 7/2681 375/147 |

(Continued)

OTHER PUBLICATIONS

3GPP, "3rd Generation Partnership Project; Technical Specification Group Radio Access Network; NG Radio Access Network; Overall Description; Stage 2 (Release 15 )", 3GPP TS 38.300 V0.0.0, Mar. 2017, pp. 1, 21-22.

(Continued)

*Primary Examiner* — Rafael Pérez-Gutiérrez
*Assistant Examiner* — Xiang Zhang
(74) *Attorney, Agent, or Firm* — Murphy, Bilak & Homiller, PLLC (57) ABSTRACT

Methods, in one or more network nodes of a wireless communication system, for transmitting non-active-state messages to wireless devices. An example method comprises obtaining capability information for one or more wireless devices, the capability information indicating, for each device, a performance constraint or a performance target of the device, or both, and further comprises selecting a message transmission mode for a first wireless device of the one or more wireless devices, where said selecting is based on the capability information. The selecting of the message transmission mode comprises selecting a relationship, with respect to time, or frequency, or both, between data symbols carrying a non-active-state message for the first wireless device and symbols carrying one or more synchronization signals and/or initial access signals. The method further comprises transmitting a non-active-state message to the first wireless device, according to the message transmission mode selected for the first wireless device.

29 Claims, 7 Drawing Sheets

(51) Int. Cl.
*H04W 72/00* (2009.01)
*H04W 76/28* (2018.01)

(56) References Cited

U.S. PATENT DOCUMENTS

| | | | | |
|---|---|---|---|---|
| 7,983,696 | B1* | 7/2011 | Manghat | H04W 52/325 |
| | | | | 455/458 |
| 9,769,794 | B1* | 9/2017 | Sitaram | H04W 68/02 |
| 2008/0165675 | A1* | 7/2008 | Yang | H04L 27/2647 |
| | | | | 370/210 |
| 2009/0010219 | A1* | 1/2009 | Lee | H04W 28/20 |
| | | | | 370/329 |
| 2010/0037114 | A1* | 2/2010 | Huang | H04L 1/1829 |
| | | | | 714/749 |
| 2010/0067478 | A1* | 3/2010 | Dillinger | H04B 7/12 |
| | | | | 370/330 |
| 2010/0278160 | A1* | 11/2010 | Park | H04L 1/0022 |
| | | | | 370/338 |
| 2010/0284326 | A1* | 11/2010 | Oh | H04L 1/0033 |
| | | | | 370/328 |
| 2010/0331019 | A1* | 12/2010 | Bhattacharjee | H04W 52/0229 |
| | | | | 455/458 |
| 2011/0287790 | A1* | 11/2011 | Haustein | H04B 7/0619 |
| | | | | 455/500 |
| 2012/0155316 | A1* | 6/2012 | Li | H04L 5/0053 |
| | | | | 370/252 |
| 2012/0218934 | A1* | 8/2012 | Takehana | H04W 84/047 |
| | | | | 370/315 |
| 2012/0307660 | A1* | 12/2012 | Lindoff | H04W 24/10 |
| | | | | 370/252 |
| 2013/0142288 | A1* | 6/2013 | Dinan | H04J 11/0069 |
| | | | | 375/340 |
| 2013/0208641 | A1* | 8/2013 | Baghel | H04W 72/082 |
| | | | | 370/311 |
| 2013/0336135 | A1* | 12/2013 | Lindoff | H04L 25/03343 |
| | | | | 370/252 |
| 2015/0109946 | A1* | 4/2015 | Sharma | H04L 5/14 |
| | | | | 370/252 |
| 2016/0029407 | A1* | 1/2016 | Soldati | H04W 52/0206 |
| | | | | 370/329 |
| 2016/0037388 | A1* | 2/2016 | Yang | H04W 76/38 |
| | | | | 370/332 |
| 2017/0105221 | A1* | 4/2017 | Ahluwalia | H04W 72/1215 |
| 2017/0208621 | A1 | 7/2017 | Dutta et al. | |
| 2017/0295585 | A1* | 10/2017 | Sorrentino | H04L 5/001 |
| 2017/0353234 | A1* | 12/2017 | Islam | H04B 7/2681 |

OTHER PUBLICATIONS

Unknown, Author, "On NR paging design", Ericsson, 3GPP TSG-RAN WG1 Meeting #88-bis, R1-176013, Spokane, US, Apr. 3-7, 2017, 1-4.

Unknown, Author, "Paging in NR", Nokia, Alcatel-Lucent Shanghai Bell, 3GPP TSG RAN WG1#88, R1-1703095, Athens, Greece, Feb. 13-17, 2017, 1-5.

Unknown, Author, "Paging in NR", ZTE, ZTE Microelectronics, 3GPP TSG RAN WG1 AH_NR Meeting, R1-1700102, Spokane, USA, Jan. 16-20, 2017, 1-6.

Unknown, Author, "WF on Paging channel Design", LG Electronics et al., 3GPP TSG RAN WG1 Meeting #88, R1-1703881, Athens, Greece, Feb. 13-17, 2017, 1-3.

Unknown, Author, "WF on Paging channel Design", LG Electronics et al., 3GPP TSG RAN WG1 Meeting #88, R1-1703923, Feb. 13-17, 2017, 1-3.

Unknown, Author, "Discussion on paging in NR", Xiaomi Technology, 3GPP TSG RAN WGI Meeting #90, R1-1714263, Prague, P.R. Czech, Aug. 21-25, 2017, 1-4.

Unknown, Author, "Further Discussion on Paging Design", MediaTek Inc., 3GPP TSG RAN WGI Meeting #90, R1-1713685, Prague, P.R. Czechia, Aug. 21-25, 2017, 1-7.

Unknown, Author, "Multi-beam Paging for NR", Huawei, HiSilicon, 3GPP TSG RAN WG 1 NR Meeting #90, R1-1712148, Prague, Czech Republic, Aug. 21-25, 2017, 1-3.

Unknown, Author, "On NR paging design", Ericsson, 3GPP TSG RAN WG1 Meeting. #90, R1-1714039, Prague, Czech Republic, Aug. 21-25, 2017, 1-5.

Unknown, Author, "On NR paging design and transmission", Guangdong OPPO Mobile Telecom, 3GPP TSG RAN WG1 Meeting #90, R1-1713253, Prague, Czech Republic, Aug. 21-25, 2017, 1-4.

Unknown, Author, "NR paging based on paging indication", InterDigital, Inc., 3GPP TSG-RAN WGI Meeting #90, R1-1714119, Prague, Czech Republic, Aug. 21-25, 2017, 1-4.

* cited by examiner

FLEXIBLE PAGING SIGNAL CONFIGURATION IN RELATION TO SYSTEM ACCESS SIGNALS

TECHNICAL FIELD

The present disclosure is related to wireless communications networks and is more particularly related to techniques for transmitting non-active-state messages, such as paging messages, to wireless devices having performance constraints or performance targets.

BACKGROUND

To connect to a wireless network, a wireless device needs to acquire network synchronization and obtain essential system information (SI). So-called synchronization signals or synch signals received from one or more wireless access points in the network are used by the wireless device to adjust the frequency of the device, relative to the frequency of the signals received from the network, and for finding the proper timing of signals received from the network.

The members of the $3^{rd}$-Generation Partnership Project (3GPP) are developing specifications for a $5^{th}$-generation wireless communications network. The radio access network (RAN) portion of this network is commonly referred to as "New Radio" or "NR." In NR, the synchronization and access procedures carried out by wireless devices may involve several signals. A primary synchronization signal (PSS) allows for network detection in the presence of a high initial frequency error, up to tens of parts per million (ppm). Additionally, the PSS provides a network timing reference. 3GPP has selected Zadoff-Chu sequences as PSS signals in LTE; the use of similar signals (in a modified version) is one of two contenders considered for NR, the other, which is the choice to date, being m-sequences. A secondary synchronization signal (SSS) that allows for more accurate frequency adjustments and channel estimation, while at the same time providing fundamental network information, e.g. cell ID, may also be used. A tertiary synchronization signal (TSS) that provides timing information within a cell, e.g. between beams transmitted from a cell, was considered for NR, but is not currently planned. Other important signals for NR are likely to include a broadcast channel (PBCH) that provides a subset of the minimum system information for random access.

Figure 1:
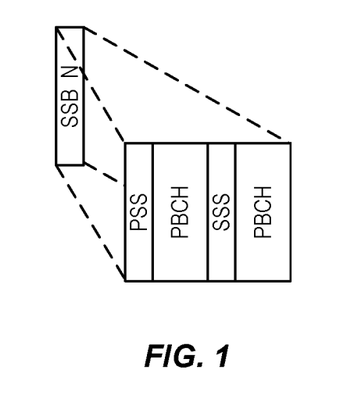
FIG. 1 illustrates an example construction of a synchronization signal block (SSB).

A synchronization signal block (SSB) as proposed for NR comprises the above signals. One possible structure is depicted in FIG. 1, where the PSS, PBCH, SSS, and PBCH are illustrated as following one another in time, to form the SSB. The PBCH is split in two symbols. The horizontal dimension in FIG. 1 corresponds to time and the vertical corresponds to frequency. If a TSS were used, it could occupy time-frequency resource elements above and/or below the PSS, PBCH, SSS, and PBCH in the frequency dimension, which corresponds to the vertical dimension in FIG. 1.

Figure 2:
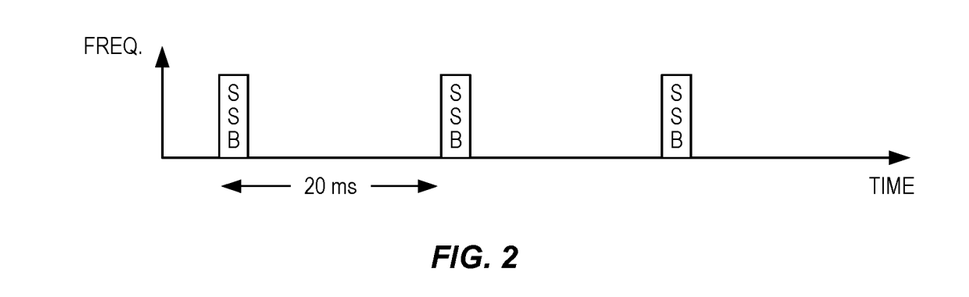
FIG. 2 illustrates an example time-frequency distribution of SSB blocks.

FIG. 2 illustrates a possible approach for transmitting SSBs—in the illustrated example, the SSB is transmitted periodically, in this case every 20 milliseconds. With respect to the bandwidth covered by the synchronization signals in NR, it has been agreed that these signals will cover a larger bandwidth than the corresponding signals do in Long-Term Evolution (LTE) systems. (These signals cover a bandwidth of 1.08 MHz bandwidth in LTE systems.) Where carrier frequencies below 6 GHz are used, one of the likely bandwidths for these signals is 4.32 MHz. Substantially wider bandwidths for these signals are likely to be used for carrier frequencies above 6 GHz.

The resource elements used in the SSB to carry the PBCH will carry only portions of the system information (SI). A physical downlink shared channel (PDSCH) will carry the remaining parts of the minimum system information; this physical downlink shared channel may be referred to as $PDSCH_{SIB}$. The $PDSCH_{SIB}$ and/or the related physical downlink control channel ($PDCCH_{SIB}$) may be transmitted in resources indicated by the PBCH.

Paging is used in wireless communication networks to inform a wireless device (referred to as a "user equipment" or "UE" in 3GPP documentation) in idle or inactive state about a need for the wireless device to connect. Paging may also be used to signal updated SI, or to signal emergency messages.

In LTE, paging is delivered like any downlink data, using the Physical Downlink Control Channel (PDCCH) and Physical Downlink Shared Channel (PDSCH) defined by 3GPP for LTE systems. A paging message, transmitted on the PDSCH, is allocated transmission resources by a scheduling assignment on the PDCCH, where this scheduling assignment is addressed to a paging radio network temporary identifier (P-RNTI), which is shared by all UEs. The delivery channel is cell-specific, since both the common reference signals (CRS) and the scrambling of the channel are derived from the physical cell identifier (PCI) for the cell.

In NR, agreements to date indicate that each paging message is scheduled by downlink control information (DCI) transmitted on a NR physical downlink control channel (NR-PDCCH), and the paging message is then transmitted on the associated NR physical downlink shared channel (NR-PDSCH). The same principles applied in LTE, i.e., delivering paging on a physical channel where the information needed to demodulate the physical channel can be derived from the camping cell's PCI, are expected to be supported in NR, as well.

Paging in NR furthermore needs to support variable payload, at least since the UE identities (IDs) used for paging may be of variable size, and paging of multiple UEs during one paging occasion needs to be supported to allow long network discontinuous transmission (DTX) cycles. It is estimated that the paging payload can be from 10-20 bits, for paging a single UE, up to several hundred information bits, for paging multiple UEs or emergency message transmission. Hence, the format needs to support at least these payload variations.

Since paging is typically performed over larger areas, single-frequency network (SFN) transmission involving multiple cells or multiple transmission points (TRPs) serving the same cell is possible, with the benefit of improving the link budget. Hence, it is expected that NR paging will support SFN transmission and allow a common configuration for the TRPs that transmit paging. NR paging will therefore likely support two options for configuration of the information needed for the UE to demodulate the paging channel, e.g., demodulation reference signals (DMRS) and the paging channel's scrambling phase: this information will either be (1) based on camping cell PCI or (2) configurable by the gNB (3GPP terminology for an NR base station) in order to support SFN transmission.

SUMMARY

According to several techniques described herein, paging signals or other non-active-state messages are multiplexed with synchronization signal transmissions adaptively, according to the characteristics of the wireless devices that the paging signals or other non-active-state messages are targeting. A wireless device is configured with the paging mode that will be used for paging signals intended and suitable for it.

To accommodate narrow-band wireless devices whose bandwidth equals the synch signal bandwidth, for example, paging signals may be configured in a time-multiplexed manner. The wireless device detects the SSB and can then, shortly after the SSB burst, read the paging information. To accommodate broad-band wireless devices, on the other hand, paging signals for such devices can be frequency-multiplexed, so to be transmitted simultaneously or at least partly overlapping in time with the SSB transmission, but at another frequency location. The wireless device can then receive both signals during the SSB reception window and minimize the receiver on-time.

In some embodiments or instances, different message transmission modes for the paging signals or other non-active-state messages can be used, or mixed, at different paging occasions. The appropriate mode can be configured for paging messages, for example, when wireless devices with certain capabilities and/or prioritized performance metrics are scheduled for paging. Wireless devices having similar relevant capabilities or prioritized performance metrics may be deliberately scheduled within the same paging opportunity. In other embodiments or instances, the network may choose whether a time-multiplexed or a frequency-multiplexed paging transmission mode is to be used at all paging occasions, based on, for example, the numbers of different types of wireless devices that are present in the network or that are monitoring the carrier bandwidth.

In an example method according to some embodiments of the presently disclosed techniques, capability information is obtained for one or more wireless devices, the capability information indicating, for each device, a performance constraint or a performance target of the device, or both. The example method further comprises selecting a message transmission mode for a first wireless device of the one or more wireless devices, where said selecting is based on the capability information. The selecting of the message transmission mode comprises selecting a relationship, with respect to time, or frequency, or both, between data symbols carrying a non-active-state message for the first wireless device and symbols carrying one or more synchronization signals and/or system access signals. The example method further comprises transmitting a non-active-state message to the first wireless device, according to the message transmission mode selected for the first wireless device. In some embodiments, this selecting of the message transmission mode comprises selecting from a frequency-multiplexed message transmission mode, in which data symbols carrying the non-active-state message for the first wireless device at least partly overlap in time with the symbols carrying one or more synchronization signals and/or system access signals, and a time-multiplexed message transmission mode, in which data symbols carrying the non-active-state message for the first wireless device do not overlap in time with symbols carrying one or more synchronization signals and/or system access signals.

An example system for transmitting non-active-state messages to wireless devices in a wireless communication network according to some embodiments of the presently disclosed techniques and apparatuses includes one or more nodes that comprise a processing circuit configured to obtain capability information for one or more wireless devices operating in the wireless communication system, where the capability information indicates, for each of the one or more wireless devices, a performance constraint of the wireless device or a performance target of the wireless device, or both. The processing circuitry is further configured to select a message transmission mode for a first wireless device of the one or more wireless devices, based on the capability information, where the selecting of the message transmission mode comprises selecting a relationship, with respect to time, or frequency, or both, between data symbols carrying a non-active-state message for the first wireless device and symbols carrying one or more synchronization signals and/or or system access signals. In some embodiments, this may comprise selecting from a frequency-multiplexed message transmission mode, in which data symbols carrying the non-active-state message for the first wireless device at least partly overlap in time with the symbols carrying one or more synchronization signals and/or system access signals, and a time-multiplexed message transmission mode, in which data symbols carrying the non-active-state message for the first wireless device do not overlap in time with the symbols carrying one or more synchronization signals and/or system access signals. The one or more nodes further comprise a transmitter circuit operatively coupled to the processing circuit and configured to transmit a non-active-state message to the first wireless device, according to the message transmission mode selected for the first wireless device.

Further aspects of the present disclosure are directed to computer program products or computer readable storage medium corresponding to the methods summarized above and functional implementations of the above-summarized apparatus and wireless device.

Of course, the present disclosure is not limited to the above features and advantages. Those of ordinary skill in the art will recognize additional features and advantages upon reading the following detailed description, and upon viewing the accompanying drawings.

DETAILED DESCRIPTION

Figure 3:
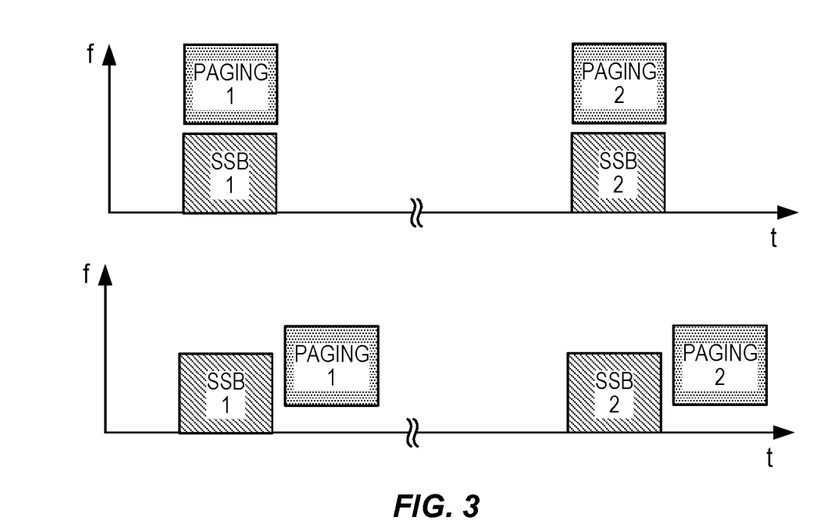
FIG. 3 illustrates possible relationships, with respect to time and frequency, between SSB transmissions and paging message transmissions.

In low-frequency bands, omnidirectional or wide-beam transmission will typically be used for paging delivery in NR systems. At higher frequencies, a sweeping of narrow beams may be used for paging, as well as for transmissions of SSB. In this case, the paging signal sweep may be aligned with the SSB sweep. Frequency-multiplexing paging in the same Orthogonal Frequency-Division Multiplexing (OFDM) symbols as SSB is an efficient solution, in terms of sweep duration. Alternatively, adjacent (or nearby) locations of SSB and paging messages with respect to time could be the preferred choice in other scenarios. NR should thus support adjacent and non-adjacent, and time-multiplexed and frequency-multiplexed SSB/paging. This can be supported if NR allows the UE to be configured by the gNB with the paging resources. Examples of frequency-multiplexing and time-multiplexing of the paging message and the SSB are shown in FIG. 3.

However, beam sweeping approaches for paging delivery have the disadvantage of large overhead, especially if many UEs need to be paged. Furthermore, the UE may need increased active/wake time to monitor the paging channel, since the UE, if moving, does not know which beam(s) in the sweep it can receive after waking up from a discontinuous receive (DRX) sleep cycle. Hence, the use of omnidirectional or wide-beam transmission with repetition, to allow accumulation of multiple receptions for UEs at the cell edge, should also be supported in NR. The number of repetitions needed to provide coverage at the cell edge depends on the deployment density and the applied modulation and coding. Since paging is typically performed over larger areas, single frequency network (SFN) transmission involving multiple cells or multiple transmission points serving the same cell is possible. The SFN mechanism improves the link budget further and should, as mentioned above, also be supported by NR.

NR is thus expected to support at least three different delivery mechanisms for paging: (1) omnidirectional or wide beam (e.g. sector) transmission, (2) sweeping of narrow beams, and (3) SFN transmission involving multiple cells or multiple TRPs serving the same cell.

In 3GPP it has been argued that the NR system design should support both time-multiplexing and frequency-multiplexing of SSB and paging signals. It is thus implied that a given network deployment may decide to use one or the other option.

If time-multiplexing is used, then bandwidth-limited UEs, such as Internet-of-Things (IoT) units, which may have bandwidths as low as 1.08 MHZ, for example, and are thus capable of receiving only one or a few OFDM resource blocks, will be able to receive paging signaling during the same paging cycle as it receives SSB, to establish synchronization. However, wider-bandwidth UEs, such as mobile broadband (MBB) terminals are forced to keep the receiver hardware activated during a longer time duration than would otherwise be necessary, to receive both SSB and paging signals, thus reducing their energy efficiency and reachable standby times.

If, on the other hand, frequency-multiplexing is used, the MBB devices can limit their receiver waking time to the SSB-related time window only, thus avoiding excessive energy consumption, while simultaneously receiving the frequency-multiplexed SSB. On the other hand, IoT UEs that are unable to simultaneously receive the SSB and the paging signal are forced to receive these signals in two steps. By first detecting the SSB and then detecting the paging signals only in the next synchronization cycle, the total wake-up time for these devices is significantly increased, which in turn affects their battery lifetimes.

There is thus a need for an improved solution that avoids consistent performance degradation, e.g., with regards to energy consumption, for one or another type of UEs in different network deployments.

To address these issues, several techniques are described herein, where paging signals or other non-active-state messages are multiplexed with synchronization signal transmissions adaptively, according to the characteristics of the wireless devices that the paging signals or other non-active-state messages are targeting. A wireless device is configured with the paging mode that will be used for paging signals intended and suitable for it.

To accommodate narrow-band wireless devices whose bandwidth equals the synch signal bandwidth, for example, paging signals may be configured in a time-multiplexed manner. The wireless device detects the SSB and can then, shortly after the SSB burst, read the paging information. To accommodate broad-band wireless devices, on the other hand, paging signals for such devices can be frequency-multiplexed, so to be transmitted simultaneously or at least partly overlapping in time with the SSB transmission, but at another frequency location. The wireless device can then receive both signals during the SSB reception window and minimize the receiver on-time.

In some embodiments or instances, different message transmission modes for the paging signals or other non-active-state messages can be used, or mixed, at different paging occasions. The appropriate mode can be configured for paging messages, for example, when wireless devices with certain capabilities and/or prioritized performance metrics are scheduled for paging. Wireless devices having similar relevant capabilities or prioritized performance metrics may be deliberately scheduled within the same paging opportunity, where a paging opportunity is any of a recurring series of intervals at which one or more wireless devices monitors for pages. In other embodiments or instances, the network may choose whether a time-multiplexed or a frequency-multiplexed paging transmission mode is to be used at all paging occasions, based on, for example, the numbers of different types of wireless devices that are present in the network or that are monitoring the carrier bandwidth.

The several techniques and apparatuses disclosed herein are described with reference to the transmission of paging messages, such as in a $5^{th}$-generation wireless network using the NR technology currently under development by 3GPP. It will be appreciated, however, that these techniques and apparatuses are not limited to the forthcoming NR system, but may be applied advantageously in other wireless systems, especially where wireless devices having varying capabilities with respect to their receiver bandwidths are expected to be simultaneously operating in the system. Furthermore, the apparatuses and specific techniques disclosed herein are not limited to paging signals or paging messages, but may be more generally applied to other non-active-state messages, where the term "non-active-state" applies to wireless device modes or states where the wireless device is not actively transmitting to and/or receiving data from the wireless network. These modes or states include the idle mode/state, where the wireless device has no established radio connection with the network but periodically activates receiver circuitry to monitor for and receive synchronization signals, system information, and/or paging messages, and may also include other inactive modes/states where the wireless device needs to activate its receiver circuitry, or "wake up," only occasionally. For convenience, some of the discussion below will refer to "paging signals" or "paging messages," which should be understood as interchangeable, but it should be also understood that the described techniques are equally applicable to other messages that may be transmitted to wireless devices operating in an idle state or other non-active state. Finally, it should be understood that the term "wireless device," as used herein, refers to wireless access devices configured for operation in a wireless communication network, and encompasses UEs, as that term is defined by 3GPP, Internet-of-Things (IoT) devices, MBB devices, etc.

Figure 4:
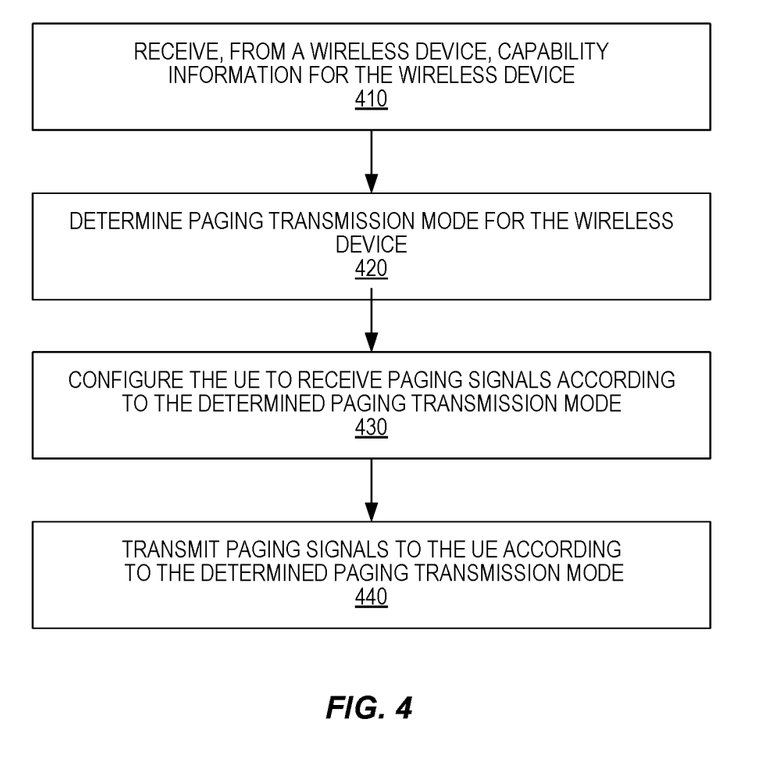
FIG. 4 is a process flow diagram illustrating an example method, carried out in a wireless network.

The network-side aspect of paging signal transmission according to several embodiments of the presently disclosed techniques is summarized in FIG. 4. As shown at block 410, the network receives, from a wireless device, capability information, which may indicate such things as supported bandwidth, energy efficiency requirements or preferences for the wireless device, etc. As shown at block 420, the network then determines a paging transmission mode for the wireless device—e.g., whether to use frequency-multiplexing or time-multiplexing in relation to SSB (and, optionally, additional paging transmission mode parameters)—based on the received capability information. As shown at block 430, the network configures the wireless device to receive paging signals according to the determined paging transmission mode. Finally, as shown at block 440, the network transmits paging signals to the UE according to the determined paging transmission mode.

Referring back to block 410 of FIG. 4, the network receives wireless device capability or hardware constraint information from a wireless device. The information may describe bandwidth limitations, for example, which might indicate that the wireless device's receiver is limited to a bandwidth that is equal to a system minimum bandwidth or equal to a SSB transmission bandwidth, or slightly wider, or much wider. The information may instead or in addition include energy efficiency targets or battery lifetime constraints (e.g., for an IoT device with long intended lifetime, or a wireless device with low battery status), ongoing connection/application/service type (e.g., indicating an application requiring short paging latency), local oscillator stability information in idle/inactive modes, etc. This information may be received by the network during initial connection establishment for the wireless device, or as a regular update scheduled by the network, or as an update specifically requested by the network, or as an update initiated by the wireless device, e.g., via higher-layer signaling. In addition, the network may take into account service type or quality-of-service (QoS) information available on the network side.

As shown at block 420 of FIG. 4, the network determines the appropriate paging transmission mode in relation to SSB transmission, based on the received capability and constraints information. The mode definition includes at least the relative time location and frequency location of the paging transmission, relative to the SSB transmission. Additional paging parameters are of course determined by the network that are outside the scope of the presently disclosed techniques, such as the paging (DRX) period, the geographical paging area, etc. While the present disclosure is not concerned with the exact formulation of these additional parameters, they are known to the network and may additionally be used for selecting the transmission mode described above.

Some examples of determining the transmission mode are the following:

If the wireless device's bandwidth equals the synch signal bandwidth, the paging signals may be selected to be configured in a time-multiplexed manner, in close proximity to the SSB transmission with respect to time, e.g. immediately following, SSB transmission. The wireless device detects the SSB and can then, shortly after the SSB burst, read the paging information.

For broad-band wireless devices, the paging signals may be selected to be frequency-multiplexed so as to be transmitted simultaneously with the SSB transmission, at another frequency location. The wireless device can then receive both signals during the SSB reception window and minimize the receiver on time.

For wireless devices with bandwidth that do not span the entire system bandwidth but exceed the SSB bandwidth, the paging signals may be selected to be frequency-multiplexed in close vicinity, e.g., immediately adjacent, to the SSB transmission, so that both simultaneously fit within the wireless device bandwidth.

For wireless devices with strong energy consumption constraints, e.g., due to desired total battery lifetime for an IoT device or low battery status of an MBB device, or for wireless devices with tight paging latency requirements, the preferred paging location position is accommodated strictly. For wireless devices without such string constraints, a non-preferred location may be chosen if it is advantageous for the network operation as a whole, e.g. by providing additional freedom for scheduling paging.

For wireless devices with short discontinuous reception (DRX) cycles and/or good local oscillator (LO) stability, which therefore are likely to maintain sufficient timing and frequency accuracy between paging occasions such that a resynchronization is unnecessary, the paging occasions may be scheduled in time locations that are not in the immediate time vicinity of SSB transmissions.

Referring to block 430 of FIG. 4, the wireless device in the illustrated example method is being configured for paging signal reception according to the determined paging transmission mode, including paging signal location in relation to the SSB location. This may be done using broadcast signaling or dedicated higher-layer signaling to the wireless device. In some embodiments, each paging transmission mode may be configured individually with respect to its requirements, e.g., with respect to the number of wireless devices included in the mode, or some other relevant considerations. Note that this step may not occur in some instances or embodiments. In these embodiments, the wireless device may be configured to infer the paging transmission mode from the capability information sent to the network, using a predetermined rule corresponding to that used by the network to determine the paging transmission mode.

As shown at block 440, paging signals are subsequently transmitted according to the determined paging transmission mode. It will be appreciated that this step may occur well after any configuration of the paging transmission mode.

Figure 5:
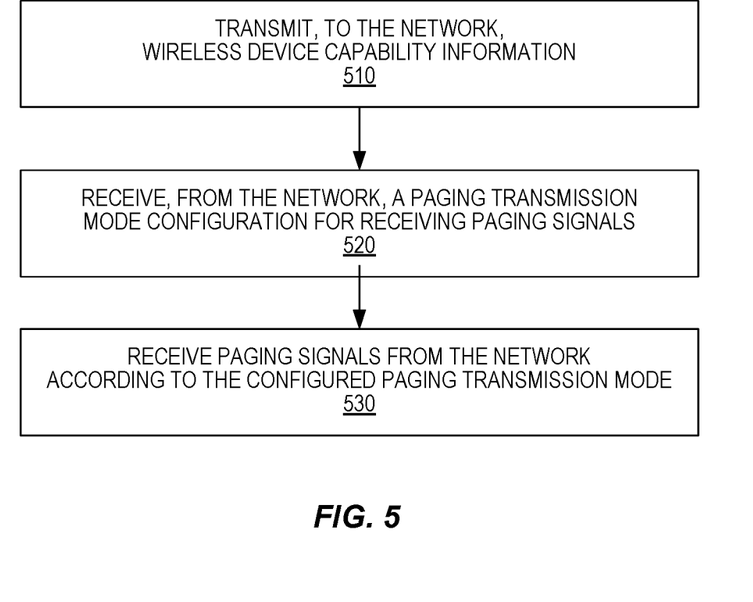
FIG. 5 is a process flow diagram illustrating another example method, carried out in a wireless device.

FIG. 5 is a process flow diagram illustrating wireless device steps corresponding to the network-side steps shown in FIG. 4. As shown at block 510, the wireless device transmits, to the network, wireless device capability information in terms of supported bandwidth, energy efficiency requirements, etc. This step corresponds to step 410 of FIG. 4, and involves the very same information. As shown at block 520, the wireless device receives, from the network, a paging transmission mode configuration for receiving paging signals. This step corresponds to step 430 of FIG. 4 and, again, involves the same information as that step. As discussed above, this step may not be present in every instance or embodiment of the illustrated technique. Finally, as shown at block 530, the wireless device receives paging signals from the network, according to the configured paging transmission mode, to initiate transmissions between the network and the wireless device.

Figure 6:
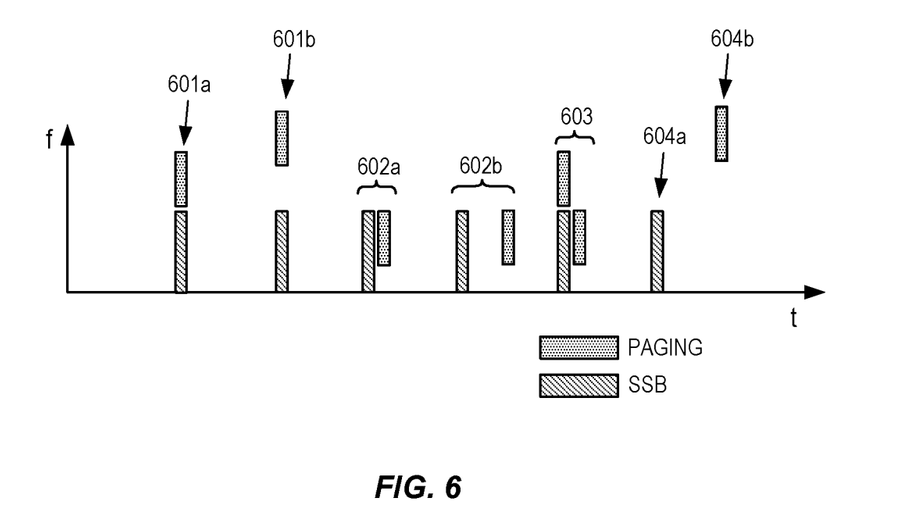
FIG. 6 illustrates different paging signal modes, having different placements of paging messages in relation to the SSB, during different paging opportunities.

In some embodiments of the presently disclosed techniques, the network determines the paging transmission mode individually for each wireless device. With this approach, multiple paging transmission modes may be active simultaneously in the network, depending on which wireless devices have been configured to monitor paging. During a given paging opportunity, the paging mode can thus be either frequency-multiplexed or time-multiplexed, or both modes may be present simultaneously. Each wireless device is monitoring its paging opportunities according to the received configuration, pointing to the paging locations that are most suitable for that wireless device. FIG. 6 illustrates several paging opportunities, and shows how different paging signal modes may be separately used, in some paging opportunities and simultaneously used in others. Moving from left to right in FIG. 6, the first two paging opportunities 601a and 601b utilize a frequency-multiplexed paging transmission mode, where the paging signal is transmitted such that it overlaps in time with the SSB, but at a different frequency. The frequency spacing varies in these two paging opportunities. In the next two paging opportunities 602a and 602b, the paging signal and SSB transmissions are time-multiplexed, in overlapping frequencies, with the time interval between them varying in the two illustrated examples. The subsequent paging opportunity 603 utilizes both frequency-multiplexing and time-multiplexing, while the last two opportunities 604a and 604b include only one or the other of the paging signal or the SSB.

Rather than determining the paging transmission mode for each wireless device individually, wireless devices with similar capabilities and/or hardware restrictions can be grouped to monitor paging simultaneously, to further maximize the paging efficiency. These grouped wireless devices are then deliberately scheduled for paging during the same paging opportunities. In other words, in any given paging opportunity, only a single paging transmission mode is used, with paging messages targeted to wireless devices among the group configured for that mode. In another paging opportunity, a different paging mode can be used, targeting wireless devices in a different.

Since the paging mode selection for a given wireless device in the above examples is wireless-device-specific and not cell-specific, but preferably the same in all cells in a region of the network, the mode should be signaled to the wireless device via dedicated signaling.

In other embodiments, the network may select a single paging transmission mode for a certain part of the network. The network thus chooses whether time-multiplexed or frequency-multiplexed paging transmission mode is to be used at all paging opportunities, for at least that part of the network. The choice of paging signal transmission mode may be based on the numbers of different types of wireless devices that are present in that part of the network, e.g., where the mode that is optimal to most wireless devices is selected. Alternatively, the selection could be based on the presence of at least some wireless devices that are especially sensitive to, for example, extended paging reception times or latency; in case any such wireless devices are present, the mode is selected that suits their preferences. In a mixed embodiment, the two approaches may be mixed, meaning that if a certain amount or fraction of sensitive wireless devices is present, their preferences are followed.

In these embodiments, the paging signaling mode is then fixed (at least semi-statically) within at least a given cell, in which case the selected format may be conveyed via broadcast signaling in each cell. Alternatively, it could be fixed within a part of the network consisting of many cells, in which case it could be signaled to the wireless device in a dedicated manner.

As mentioned above, the principles of the techniques may also be applied to transmission of other signals, such as tracking area signals and other signals received in the idle/inactive modes. Under the assumption that the time-multiplexing and frequency-multiplexing options are supported by relevant standards, the basic techniques described herein, i.e., adaptively, wireless device-specifically configuring paging transmission modes, may be implemented as a network proprietary algorithm. However, some aspects may be aided by additional standardized features, e.g. efficient signaling of capabilities or configuration.

While the description above presented the paging signaling mode selection process as a choice between qualitatively different paging signal placements (as in FIG. 6), the selection can further involve determining sub-configurations within each mode. This may regard selection of specific parameters or placement pattern sub-classes that, according to some criterion, can be categorized under the mode types discussed above. For example, the allocated paging signal span in time and/or frequency can depend on the bandwidth capabilities of the wireless device, the number of wireless devices addressed in the given paging occasion, etc. The paging signal span in time in frequency-multiplexed mode may be equal, shorter, or longer than that of the matching SSB. Similarly, the paging signal span in frequency in time-multiplexed mode may be equal, shorter, or longer than that of the matching SSB.

The description above has referred to paging signaling in general, without focusing on specific signaling formats. In some embodiments, the paging signals whose mode is determined according to the techniques described herein may include only the paging indicator field (carried by downlink control information (DCI) on PDCCH in NR). In other cases, it may also include the paging message (carried by PDCCH).

Figure 7:
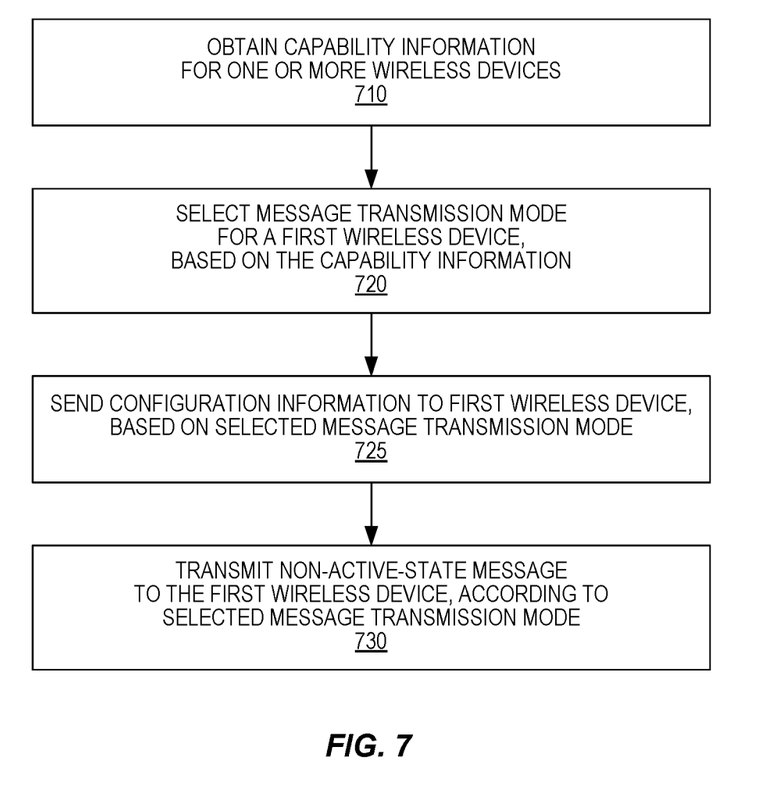
FIG. 7 is another process flow diagram illustrating an example method, carried out in a wireless communication system.

In view of the discussion above, it will be appreciated that the process flow diagram illustrated in FIG. 7 is a generalized method for transmitting non-active-state messages to wireless devices according to the above-described techniques, as carried out in one or more network nodes of a wireless communication system. In some embodiments, the illustrated method is carried out in a wireless access point of the wireless communication system, such as in a gNB of an NR system. In others, the illustrated method is carried out by one or more nodes of the network, e.g., where the message transmission mode is selected by one node and the transmission of a message according to the selection is carried out by one or more wireless access points.

As shown at block 710, the illustrated method begins with obtaining capability information for one or more wireless devices operating in the wireless communication system, where the capability information indicates, for each of the one or more wireless devices, a performance constraint of the wireless device or a performance target of the wireless device, or both. This capability information for the one or more wireless devices may comprise, for example, one or more of: a bandwidth supported by the respective wireless device; an energy efficiency target or constraint for the respective wireless device; information indicating one or more applications running on the respective wireless device; information indicating one or more services required by the respective wireless device; a wake-up time (e.g., a radiooff-to-radio-on transition time); permissible duration of radio on-time per paging monitoring instance; and reference oscillator stability information for the respective wireless device. Other examples were discussed above.

As shown at block 720, the method further comprises selecting a message transmission mode for a first wireless device of the one or more wireless devices, where this selecting is based on the capability information and comprises selecting a relationship, with respect to time, or frequency, or both, between data symbols carrying a non-active-state message for the first wireless device and symbols carrying one or more synchronization signals and/or initial access signals. In some embodiments, the symbols carrying one or more synchronization signals and/or system access signals carry synchronization signals and a physical broadcast channel, PBCH, e.g., like the SSB discussed above. In some embodiments, as extensively discussed above, the message transmission mode is for transmitting paging messages, and the transmitted non-active-state message is a paging message for the first wireless device.

In some embodiments, this selection of the message transmission mode for the first wireless device comprises selecting from a frequency-multiplexed message transmission mode, in which data symbols carrying the non-active-state message for the first wireless device at least partly overlap in time with the symbols carrying one or more synchronization signals and/or system access signals, and a time-multiplexed message transmission mode, in which data symbols carrying the non-active-state message for the first wireless device do not overlap in time with the symbols carrying one or more synchronization signals and/or system access signals. In some of these embodiments, the selection of the message transmission mode is carried out individually, for each wireless device. Thus, in some embodiments, the method may further comprise separately selecting a message transmission mode for a second wireless device of the one or more wireless devices, where said separately selecting is based on the capability information and comprises selecting from the frequency-multiplexed message transmission mode and the time-multiplexed message transmission mode, the message transmission mode selected for the second wireless device differing from the message transmission selected for the first wireless device. Note that this step is not shown in FIG. 7.

In some embodiments or instances, only time-multiplexed transmission modes may be supported, where the capability information relates to one or more of a radio-off-to-radio-on transition time for the first wireless device, a permissible duration of radio on-time per paging monitoring instance, a discontinuous-receive, DRX, cycle time for the first wireless device, and a reference oscillator stability of the first wireless device. In some of these embodiments, the selecting of the message transmission mode for the first wireless device, as illustrated at block 720 of FIG. 7, comprises determining a closeness in time between the data symbols carrying a non-active-state message for the first wireless device and the symbols carrying one or more synchronization signals and/or system access signals, based on the one or more of the radio-off-to-radio-on transition time for the first wireless device, a permissible duration of radio on-time per paging monitoring instance, the DRX cycle time for the first wireless device, and the reference oscillator stability of the first wireless device. As discussed above, for example, the time interval between the non-active-state message and the synchronization signals may be selected to be larger for devices that report capability information indicating relatively good LO stability, or relatively short DRX cycles, compared to other devices.

As shown at block 730 of FIG. 7, the method further comprises transmitting a non-active-state message to the first wireless device, according to the message transmission mode selected for the first wireless device. In some embodiments or instances where a different message transmission mode is selected for a second wireless device, a non-active-state message is transmitted to the second wireless device, according to the message transmission mode selected for the second wireless device, during the same paging opportunity in which the non-active-state message is transmitted to the first wireless device. In others of these embodiments or instances, the non-active-state message transmitted to the second wireless device is transmitted during a different paging opportunity.

In some embodiments, the illustrated method comprises sending configuration information to the first wireless device, prior to transmitting the non-active-state message, where the configuration information is determined based on the message transmission mode selected for the first wireless device and indicates which resource elements are to be monitored by the first wireless device for non-active-state messages. This is shown at block 725, which is illustrated with a dashed outline to indicate that it need not be present in every instance or embodiment of the illustrated method.

In some embodiments of the illustrated method, the selecting of the message transmission mode for the first wireless device is further based on a DRX cycle time for the first wireless device. In some embodiments, selecting the message transmission mode for the first wireless device is based on capability information for a group of devices, i.e., multiple ones of the one or more wireless devices, including the first wireless device. In these cases, the illustrated method may further comprise sending a non-active-state message to each of one or more others of the multiple ones, according to the message transmission mode selected for the first wireless device.

In some embodiments, the obtaining of the capability information for the one or more wireless devices, as shown at block 710 of FIG. 7, is performed by a control node and comprises receiving the capability information from wireless access nodes serving the one or more wireless devices. In these embodiments, selecting the message transmission mode for the first wireless device is also performed by the control node. In these embodiments, the method may further comprise sending an indication of the message transmission mode for the first wireless device to one or more paging wireless access nodes, for use by the paging wireless access nodes when transmitting the non-active-state message to the first wireless device as shown at block 730.

In other embodiments, the obtaining of the capability information for the one or more wireless devices, as shown at block 710 of FIG. 7, is performed by one or more wireless access nodes and comprises receiving the capability information from the one or more wireless devices. In these embodiments, the selecting of the message transmission mode and the transmitting of the non-active-state message according to the selected message transmission mode are carried out by the same wireless access node or one or more others of the one or more wireless access nodes.

Figure 8:
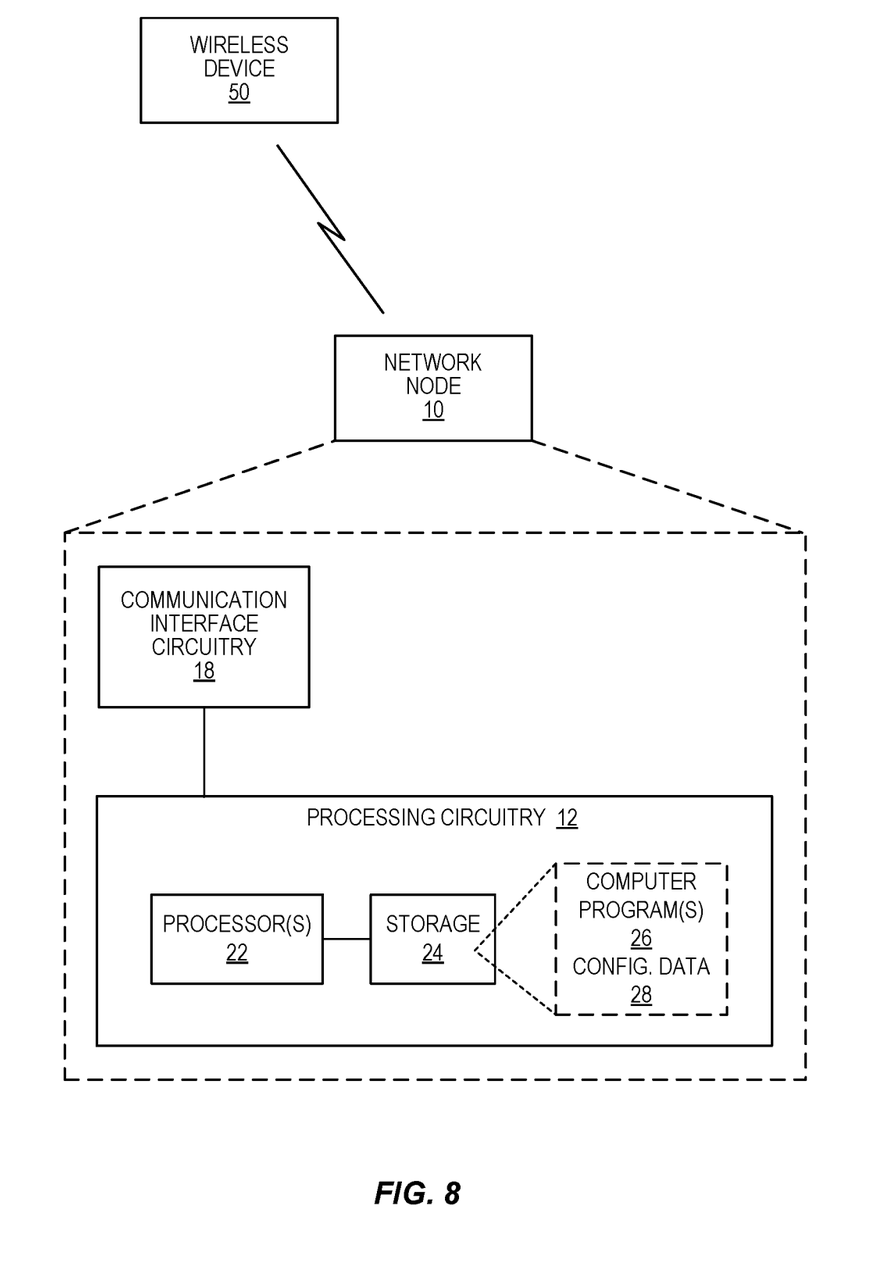
FIG. 8 is a block diagram illustrating an example network node, according to some embodiments.

FIG. 8 illustrates an example network node 10 that may be configured to carry out all or parts of the methods discussed above. Two or more nodes may cooperate to carry out one or more of these methods, in some embodiments. For example, as discussed above, in some embodiments a control node may obtain the capability information for the wireless devices and select the message transmission mode for one or more wireless devices, and then indicate the selection to a wireless access node that transmits the non-active-state message according to the selected mode. In other embodiments, one wireless access node may carry out the obtaining of capability information and selection of the message transmission mode for at least one wireless device, and then inform one or more other wireless access nodes or other nodes of this selection, so that subsequent transmissions of messages to the wireless device are made according to the selected mode.

The network node 10 shown in FIG. 8 is shown generically, so as to cover all of these options. The details underlying the illustrated structure are well known to those familiar with the structure and design of wireless network equipment.

Network node 10 includes communication interface circuitry 18 and processing circuitry 12. In the event that network node 10 is a control node that does not communicate directly with wireless devices, communication interface circuitry 18 may comprise network interface circuitry for communicating with other network nodes, such as wireless access points, using standard communications protocols and hardware. In the event that network node 10 is instead a wireless access point, communication interface circuitry 18 may comprise radio transceiver circuitry, including receiver circuitry and transmitter circuitry, configured to communicate with one or more wireless devices, such as the illustrated wireless device 50, in addition to network interface circuitry for communicating with other network nodes. Note that all or parts of the transceiver circuitry may be physically separated from the rest of the network node, e.g., in remote radio heads or other distributed transceiver apparatuses.

The node 10 further includes processing circuitry 12 that is operatively associated with the communication interface circuitry 18. In an example embodiment, the processing circuitry 12 comprises one or more digital processors 22, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 12 may comprise fixed circuitry, or programmable circuitry that is specially configured via the execution of program instructions implementing the functionality taught herein.

The processing circuitry 12 also includes or is associated with storage 24. The storage 24, in some embodiments, stores one or more computer programs 26 and, optionally, configuration data 28 (e.g., a configured value to control synch-signal resource selection). The storage 24 provides non-transitory storage for the computer program 26 and it may comprise one or more types of computer-readable media, such as disk storage, solid-state memory storage, or any mix thereof. By way of non-limiting example, the storage 24 comprises any one or more of SRAM, DRAM, EEPROM, and FLASH memory.

In general, the storage 24 comprises one or more types of computer-readable storage media providing non-transitory storage of the computer program 26 and any configuration data 28 used by the control node 10. Here, "non-transitory" means permanent, semi-permanent, or at least temporarily persistent storage and encompasses both long-term storage in non-volatile memory and storage in working memory, e.g., for program execution.

In some embodiments, the processor 22 of the processing circuitry 12 may execute a computer program 26 stored in the storage 24 that configures the processor 22 to perform all or parts of the techniques described herein, including all or parts of the method illustrated in FIG. 7 and described in detail above. Thus, for example, the processing circuitry 12 may be configured, e.g., with appropriate program code 26 stored in storage 24, to obtain capability information for one or more wireless devices operating in the wireless communication system, the capability information indicating, for each of the one or more wireless devices, a performance constraint of the wireless device or a performance target of the wireless device, or both. The processing circuitry 12 may be further configured to select a message transmission mode for a first wireless device of the one or more wireless devices, based on the capability information, where said selecting of the message transmission mode comprises selecting a relationship, with respect to time, or frequency, or both, between data symbols carrying a non-active-state message for the first wireless device and symbols carrying one or more synchronization signals and/or system access signals. In some embodiments, this may include selecting from a frequency-multiplexed message transmission mode, in which data symbols carrying the non-active-state message for the first wireless device at least partly overlap in time with the symbols carrying one or more synchronization signals and/or system access signals, and a time-multiplexed message transmission mode, in which data symbols carrying the non-active-state message for the first wireless device do not overlap in time with the symbols carrying one or more synchronization signals and/or system access signals.

In some embodiments, processing circuitry 12 may be further configured to cause the transmitting of a non-active-state message to the first wireless device, via transmitter circuitry included in the network node 10 or in another network node. In some embodiments, processing circuitry 12 may be configured to send configuration information to the first wireless device, e.g., via transmitter circuitry included in the network node, where the configuration information is determined based on the message transmission mode selected for the first wireless device and indicates which resource elements are to be monitored by the first wireless device for non-active-state messages. Again, it should be noted that these functions may be distributed across several network nodes, in some embodiments, such that different nodes perform the selecting of the message transmission mode, the sending of the configuration information, and the transmitting of the non-active-state messages according to the selected message transmission mode.

Figure 9:
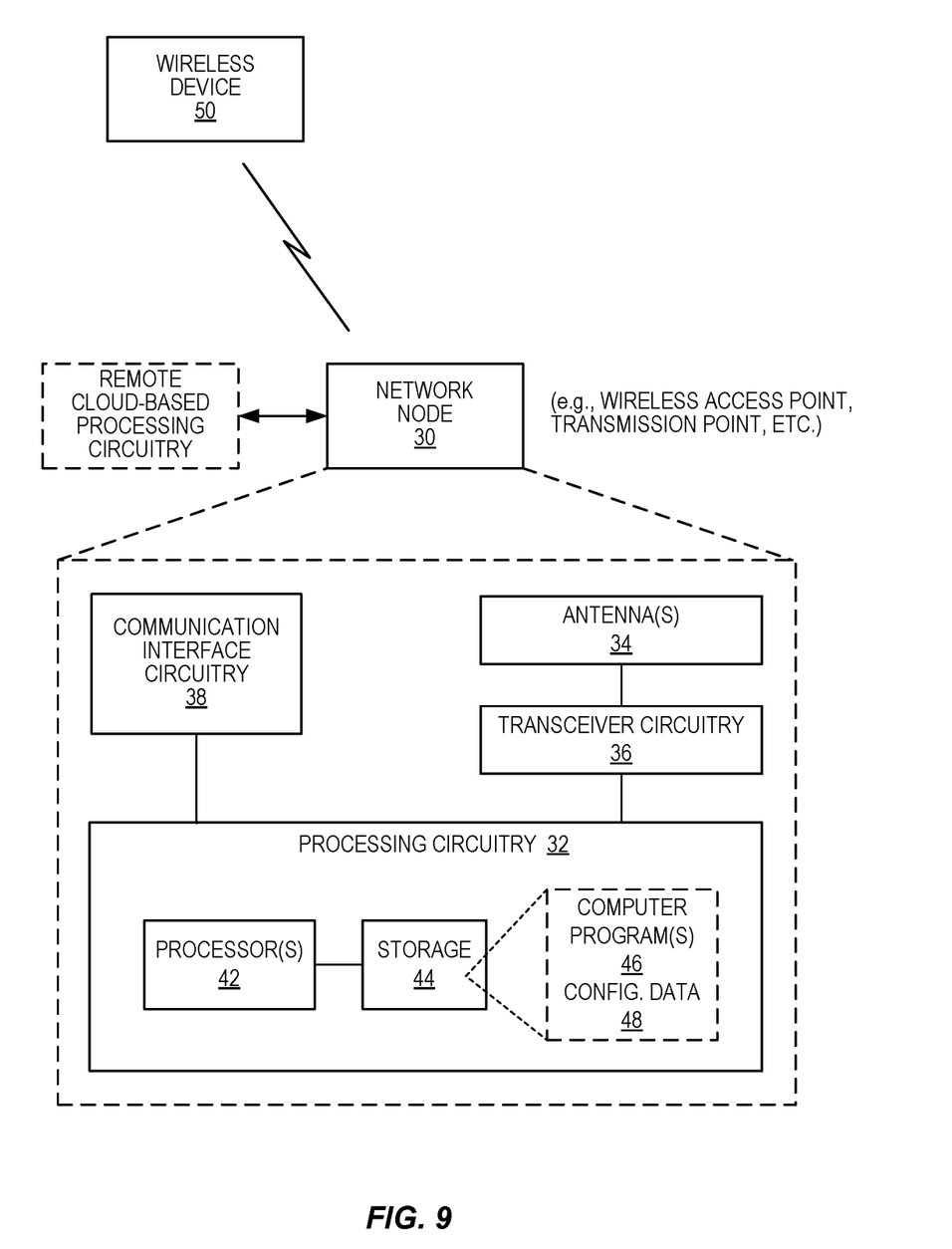
FIG. 9 is a block diagram illustrating another example network node.

For instance, FIG. 9 illustrates an example of a network node 30 that is a wireless access point, transmission point, or the like, which cooperates with one or more other remote network nodes, one or more of which may be in the Internet "cloud," to carry out one or more of the techniques described herein. The network node 30 includes communication interface circuitry 38 for communicating with other nodes of the same type or of varying types. For example, the network node 30 cooperates with a remote or cloud-based processing element, acting as a control node, that performs at least some of the network-side processing described herein, such as the obtaining of capability information for one or more wireless devices and the selection of a message transmission mode for transmitting non-active-state messages, based on the capability information.

The network node 30 communicates with wireless devices operating in the network, such as the illustrated wireless device 50, via antennas 34 and a transceiver circuitry 36. The transceiver circuitry 36 may include transmitter circuits, receiver circuits, and associated control circuits that are collectively configured to transmit and receive signals according to one or more radio access technology, for communicatively coupling wireless devices to the network.

In one or more embodiments, the processing circuitry 32 comprises one or more digital processors 42, e.g., one or more microprocessors, microcontrollers, DSPs, FPGAs, CPLDs, ASICs, or any mix thereof. More generally, the processing circuitry 32 may comprise fixed circuitry, or programmable circuitry that is specially configured via the execution of program instructions implementing all or parts of the functionality taught herein, or may comprise some mix of fixed and programmed circuitry The processing circuitry 32 also includes or is associated with storage 44. The storage 44, in some embodiments, stores one or more computer programs 46 and, optionally, configuration data 48. The storage 44 provides non-transitory storage for the computer program 46 and it may comprise one or more types of computer-readable media, such as disk storage, solid-state memory storage, or any mix thereof. By way of non-limiting example, the storage 44 comprises any one or more of SRAM, DRAM, EEPROM, and FLASH memory.

In general, the storage 44 comprises one or more types of computer-readable storage media providing non-transitory storage of the computer program 46 and any configuration data 48 used by the network node 30. Here, "non-transitory" means permanent, semi-permanent, or at least temporarily persistent storage and encompasses both long-term storage in non-volatile memory and storage in working memory, e.g., for program execution.

It should be appreciated that all of the variations of the techniques described above, e.g., in connection with the method illustrated in FIG. 7, are applicable to the network nodes described here and illustrated in FIGS. 8 and 9.

The techniques described herein can advantageously be used to facilitate the maximizing paging-related energy efficiency for all types of wireless devices, whether narrowband or broadband, without requiring a trade-off that is unfavorable for some wireless device types. This extends the standby time and battery lifetime of the wireless devices in the network. Another is that by scheduling wideband devices in frequency-division mode with respect to the SSB, fewer resources outside the SSB are required for paging, implying more resources available for data. Further, for some antenna types (e.g., analog beamforming) the SSB segments will be difficult to use for anything else than the SSB, since the beam is not pointing towards a specific wireless device, but rather in a general direction in order to cover a certain bit of the cell Other advantages may be apparent to those of ordinary skill in the art of wireless communication system design and implementation. Notably, modifications and other embodiments of the disclosed techniques will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in one or more network nodes of a wireless communication system, for transmitting non-active-state messages to wireless devices, the method comprising:

obtaining capability information for one or more wireless devices operating in the wireless communication system, the capability information indicating, for each of the one or more wireless devices, a performance constraint of the wireless device or a performance target of the wireless device, or both;

selecting a message transmission mode for a first wireless device of the one or more wireless devices, wherein said selecting is based on the capability information and comprises selecting a relationship, with respect to time, or frequency, or both, between data symbols carrying a non-active-state message for the first wireless device and symbols carrying one or more synchronization signals and/or system access signals; and transmitting a non-active-state message to the first wireless device, according to the message transmission mode selected for the first wireless device.

2. The method of claim 1, wherein the symbols carrying one or more synchronization signals and/or system access signals carry synchronization signals and a physical broadcast channel (PBCH).

3. The method of claim 1, wherein selecting the message transmission mode for the first wireless device based on the capability information comprises selecting from a frequency-multiplexed message transmission mode, in which data symbols carrying the non-active-state message for the first wireless device at least partly overlap in time with the symbols carrying one or more synchronization signals and/or system access signals, and a time-multiplexed message transmission mode, in which data symbols carrying the non-active-state message for the first wireless device do not overlap in time with the symbols carrying one or more synchronization signals and/or system access signals.

4. The method of claim 3, further comprising:

separately selecting a message transmission mode for a second wireless device of the one or more wireless devices, wherein said separately selecting is based on the capability information and comprises selecting from the frequency-multiplexed message transmission mode and the time-multiplexed message transmission mode, the message transmission mode selected for the second wireless device differing from the message transmission selected for the first wireless device; and transmitting a non-active-state message to the second wireless device, according to the message transmission mode selected for the second wireless device.

5. The method of claim 4, wherein the transmitting the non-active-state message to the first wireless device is performed during a same paging opportunity as transmitting the non-active-state message to the second wireless device.

6. The method of claim 1, wherein the capability information relates to one or more of a radio-off-to-radio-on transition time for the first wireless device, a permissible duration of radio on-time per paging monitoring instance, a discontinuous-receive (DRX) cycle time for the first wireless device, and a reference oscillator stability of the first wireless device, and wherein selecting the message transmission mode for the first wireless device based on the capability information comprises determining a closeness in time between the data symbols carrying a non-active-state message for the first wireless device and the symbols carrying one or more synchronization signals and/or system access signals, based on the one or more of the radio-off-to-radio-on transition time for the first wireless device, the permissible duration of radio on-time per paging monitoring instance, the DRX cycle time for the first wireless device, and the reference oscillator stability of the first wireless device.

7. The method of claim 1, further comprising, prior to said transmitting, sending configuration information to the first wireless device, wherein the configuration information is determined based on the message transmission mode selected for the first wireless device and indicates which resource elements are to be monitored by the first wireless device for non-active-state messages.

8. The method of claim 1, wherein the message transmission mode is for transmitting paging messages, and wherein the transmitted non-active-state message is a paging message for the first wireless device.

9. The method of claim 1, wherein the capability information for the one or more wireless devices comprises, for each of the one or more wireless devices, one or more of:
a bandwidth supported by the respective wireless device;
an energy efficiency target or constraint for the respective wireless device;
information indicating one or more applications running on the respective wireless device;
information indicating one or more services required by the respective wireless device;
radio-off-to-radio-on transition time for the first wireless device;
a permissible duration of radio on-time per paging monitoring instance; and
reference oscillator stability information for the respective wireless device.

10. The method of claim 1, wherein selecting the message transmission mode for the first wireless device is further based on a discontinuous-receive, DRX, cycle time for the first wireless device.

11. The method of claim 1, wherein selecting the message transmission mode for the first wireless device is based on capability information for multiple ones of the one or more wireless devices, including the first wireless device, and wherein the method further comprises sending a non-active-state message to each of one or more others of the multiple ones, according to the message transmission mode selected for the first wireless device.

12. The method of claim 1, wherein obtaining the capability information for the one or more wireless devices is performed by a control node and comprises receiving the capability information from wireless access nodes serving the one or more wireless devices, wherein selecting the message transmission mode for the first wireless device is performed by the control node, and wherein the method further comprises sending an indication of the message transmission mode for the first wireless device to one or more paging wireless access nodes, for use by the paging wireless access nodes when transmitting the non-active-state message to the first wireless device.

13. The method of claim 1, wherein obtaining the capability information for the one or more wireless devices is performed by one or more wireless access nodes serving the one or more wireless devices and comprises receiving the capability information from the one or more wireless devices.

14. A system for transmitting non-active-state messages to wireless devices in a wireless communication network, the system comprising one or more nodes that comprise:
a processing circuit configured to obtain capability information for one or more wireless devices operating in the wireless communication system, the capability information indicating, for each of the one or more wireless devices, a performance constraint of the wireless device or a performance target of the wireless device, or both, and to select a message transmission mode for a first wireless device of the one or more wireless devices, based on the capability information, wherein said selecting of the message transmission mode comprises selecting a relationship, with respect to time, or frequency, or both, between data symbols carrying a non-active-state message for the first wireless device and symbols carrying one or more synchronization signals and/or system access signals; and
a transmitter circuit operatively coupled to the processing circuit and configured to transmit a non-active-state message to the first wireless device, according to the message transmission mode selected for the first wireless device.

15. The system of claim 14, wherein the symbols carrying one or more synchronization signals and/or system access signals carry synchronization signals and a physical broadcast channel (PBCH).

16. The system of claim 14, wherein the processing circuit is configured to select the message transmission mode for the first wireless device based on the capability information by selecting from a frequency-multiplexed message transmission mode, in which data symbols carrying the non-active-state message for the first wireless device at least partly overlap in time with the symbols carrying one or more synchronization signals and/or system access signals, and a time-multiplexed message transmission mode, in which data symbols carrying the non-active-state message for the first wireless device do not overlap in time with the symbols carrying one or more synchronization signals and/or system access signals.

17. The system of claim 16:
wherein the processing circuit is further configured to separately select a message transmission mode for a second wireless device of the one or more wireless devices, wherein said separately selecting is based on the capability information and comprises selecting from the frequency-multiplexed message transmission mode and the time-multiplexed message transmission mode, the message transmission mode selected for the second wireless device differing from the message transmission selected for the first wireless device; and
wherein the transmitter circuit is further configured transmit a non-active-state message to the second wireless device, via the transmitter circuit, according to the message transmission mode selected for the second wireless device.

18. The system of claim 17, wherein the transmitter circuit is configured to transmit the non-active-state message to the first wireless device is performed during a same paging opportunity as transmitting the non-active-state message to the second wireless device.

19. The system of claim 14, wherein the capability information relates to one or more of a radio-off-to-radio-on transition time for the first wireless device, a permissible duration of radio on-time per paging monitoring instance, a discontinuous-receive (DRX) cycle time for the first wireless device, and a reference oscillator stability of the first wireless device, and wherein the processing circuit is configured to determine a closeness in time between the data symbols carrying a non-active-state message for the first wireless device and the symbols carrying one or more synchronization signals, based on the one or more of the radio-off-to-radio-on transition time for the first wireless device, a permissible duration of radio on-time per paging monitoring instance, the DRX cycle time for the first wireless device, and the reference oscillator stability of the first wireless device.

20. The system of claim 14, wherein the processing circuit is further configured to send configuration information to the first wireless device, wherein the configuration information is determined based on the message transmission mode selected for the first wireless device and indicates which resource elements are to be monitored by the first wireless device for non-active-state messages.

21. The system of claim 14, wherein the message transmission mode is for transmitting paging messages, and wherein the transmitted non-active-state message is a paging message for the first wireless device.

22. The system of claim 14, wherein the capability information for the one or more wireless devices comprises, for each of the one or more wireless devices, one or more of:
    a bandwidth supported by the respective wireless device;
    an energy efficiency target or constraint for the respective wireless device;
    information indicating one or more applications running on the respective wireless device;
    information indicating one or more services required by the respective wireless device;
    a radio-off-to-radio-on transition time for the first wireless device;
    a permissible duration of radio on-time per paging monitoring instance; and
    reference oscillator stability information for the respective wireless device.

23. The system of claim 14, wherein the processing circuit is configured to select the message transmission mode for the first wireless device based further on a discontinuous-receive (DRX) cycle time for the first wireless device.

24. The system of claim 14, wherein the processing circuit is configured to select the message transmission mode for the first wireless device based on capability information for multiple ones of the one or more wireless devices, including the first wireless device.

25. The system of claim 14, wherein the processing circuit is in a control node of the wireless communication network and is further configured to receive the capability information from wireless access nodes serving the one or more wireless device and to send an indication of the message transmission mode for the first wireless device to a paging wireless access node that comprises the transmitter circuit.

26. The system of claim 14, wherein the processing circuit and the transmitter circuit are in a wireless access node serving the one or more wireless devices, and wherein the processing circuit is configured to receive the capability information from the one or more wireless devices, via a receiver circuit in the wireless access node.

27. A non-transitory computer-readable storage medium, having stored thereon a computer program product comprising program instructions for execution by a processing circuit in a network node of a wireless communication system, the program instructions being configured to, when executed by the processing circuit, cause the network node to:
    obtain capability information for one or more wireless devices operating in the wireless communication system, the capability information indicating, for each of the one or more wireless devices, a performance constraint of the wireless device or a performance target of the wireless device, or both;
    select a message transmission mode for a first wireless device of the one or more wireless devices, wherein said selecting is based on the capability information and comprises selecting a relationship, with respect to time, or frequency, or both, between data symbols carrying a non-active-state message for the first wireless device and symbols carrying one or more synchronization signals and/or system access signals; and
    transmit a non-active-state message to the first wireless device, according to the message transmission mode selected for the first wireless device.

28. The non-transitory computer-readable storage medium of claim 27, wherein the program instructions are configured to cause the network node to select the message transmission mode for the first wireless device based on the capability information by selecting from a frequency-multiplexed message transmission mode, in which data symbols carrying the non-active-state message for the first wireless device at least partly overlap in time with the symbols carrying one or more synchronization signals and/or system access signals, and a time-multiplexed message transmission mode, in which data symbols carrying the non-active-state message for the first wireless device do not overlap in time with the symbols carrying one or more synchronization signals and/or system access signals.

29. The non-transitory computer-readable storage medium of claim 27, wherein the capability information relates to one or more of a radio-off-to-radio-on transition time for the first wireless device, a permissible duration of radio on-time per paging monitoring instance, a discontinuous-receive (DRX) cycle time for the first wireless device, and a reference oscillator stability of the first wireless device, wherein the program instructions are configured to cause the network node to determine a closeness in time between the data symbols carrying a non-active-state message for the first wireless device and the symbols carrying one or more synchronization signals, based on the one or more of the radio-off-to-radio-on transition time for the first wireless device, a permissible duration of radio on-time per paging monitoring instance, the DRX cycle time for the first wireless device, and the reference oscillator stability of the first wireless device.

* * * * *